United States Patent
Kim et al.

(10) Patent No.: US 8,139,014 B2
(45) Date of Patent: Mar. 20, 2012

(54) SKEW ADJUSTMENT CIRCUIT AND A METHOD THEREOF

(75) Inventors: Byung-koan Kim, Gwacheon-si (KR); Ock-chul Shin, Seoul (KR); Young-chul Rhee, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 833 days.

(21) Appl. No.: 12/247,713

(22) Filed: Oct. 8, 2008

(65) Prior Publication Data

US 2009/0206897 A1 Aug. 20, 2009

(30) Foreign Application Priority Data

Feb. 20, 2008 (KR) .................. 10-2008-0015493

(51) Int. Cl.
*G09G 3/36* (2006.01)
(52) U.S. Cl. .......................................... 345/98
(58) Field of Classification Search ............ 345/76–104, 345/204, 211–213
See application file for complete search history.

(56) References Cited

U.S. PATENT DOCUMENTS

| | | | |
|---|---|---|---|
| 5,712,884 A * | 1/1998 | Jeong | 375/375 |
| 6,114,890 A * | 9/2000 | Okajima et al. | 327/170 |
| 6,299,336 B1 | 10/2001 | Hulse | |
| 6,392,641 B1 * | 5/2002 | Nishimura et al. | 345/213 |
| 6,590,559 B2 * | 7/2003 | Takabayashi et al. | 345/99 |

FOREIGN PATENT DOCUMENTS

| | | |
|---|---|---|
| KR | 1020060077372 | 7/2006 |
| KR | 1020060106855 | 10/2006 |

\* cited by examiner

*Primary Examiner* — Jimmy H Nguyen
(74) *Attorney, Agent, or Firm* — F. Chau & Associates, LLC

(57) ABSTRACT

Provided are a skew adjustment circuit and a method thereof. The skew adjustment circuit inputs an input clock signal and an input start pulse signal to output an output clock signal and an output start pulse signal which are delayed according to a skew value of a skew control signal. The skew adjustment circuit includes a delay circuit, a selection circuit, and an output circuit. The delay circuit delays an input clock signal by a skew value in response to a skew control signal to generate an output clock signal. The selection circuit compares the skew control signal and an offset control signal to select one of the input start pulse signal and a delayed start pulse signal to output the selected signal as a start pulse signal. The output circuit responds to the output clock signal to output the start pulse signal as an output start pulse signal.

20 Claims, 5 Drawing Sheets

SKEW ADJUSTMENT CIRCUIT AND A METHOD THEREOF

CROSS-REFERENCE TO RELATED PATENT APPLICATION

This application claims priority to Korean Patent Application No. 10-2008-0015493, filed on Feb. 20, 2008 in the Korean Intellectual Property Office, the disclosure of which is incorporated by reference in their entirety.

BACKGROUND OF THE INVENTION

1. Technical Field

The present disclosure relates to a display device, and more particularly, to a skew adjustment circuit and a method of adjusting skew.

2. Discussion of the Related Art

Display devices may include STN (super-twisted nematic) LCD (liquid crystal display) panel or a TFT (thin film transistor) LCD panel and a driving circuit driving the LCD panel. In the case of a TFT-LCD, the driving circuit includes a gate driver driving gate lines of a TFT, a source driver driving source lines of the TFT, and a timing controller. As the gate driver turns on the TFT by applying a high voltage, and the source driver applies source driving signals to the source lines for displaying colors, a screen is displayed on the TFT-LCD.

A timing controller controls the gate driver and the source driver based on display control signals such as a clock signal, a display timing signal, a horizontal synchronization signal, a vertical synchronization signal, etc. and display data (R, G, and B). The timing controller transmits output display data, an output clock signal, an output start pulse signal, etc. to signal lines of a source driver and transmission lines between source drivers. To help the source driver accurately receive output display data, the timing controller may adjust the skew of the output clock signals using a DLL (delay locked loop) circuit.

A delay-locked loop (DLL) is a digital circuit similar to a phase-locked loop (PLL), with the main difference being the absence of an internal oscillator. A DLL can be used to change the phase of a clock signal, usually to enhance the clock rise-to-data output valid timing characteristics of integrated circuits.

FIG. 1 illustrates a conventional skew adjustment circuit 100. Referring to FIG. 1, the skew adjustment circuit 100 includes a DLL circuit 110 and a D-flipflop 120. The DLL circuit 110 responds to a skew control signal DLL_SKEW to delay an input clock signal CLK_IN by a skew value and then generates an output clock signal CLK_OUT. The D-flipflop 120 responds to the output clock signal CLK_OUT to receive an input start pulse signal STH_IN and output an output start pulse signal STH_OUT. The skew adjustment circuit 100 outputs the output clock signal CLK_OUT and the output start pulse signal STH_OUT which are delayed by the skew value.

FIG. 2 is a timing diagram of the skew adjustment circuit 100 of FIG. 1. Referring to FIG. 2, an output clock signal CLK_OUT is delayed by a ⅛ period of an input clock signal CLK_IN according to a skew control signal DLL_SKEW. That is, if a skew value of the skew control signal DLL_SKEW is 0, the output clock signal CLK_OUT is generated according to the input clock signal CLK_IN. If a skew value of the skew control signal DLL_SKEW is 1, the output clock signal CLK_OUT delayed by a ⅛ period of the input clock signal CLK_IN is generated, and an output start pulse signal STH_OUT delayed by a ⅛ period of the input clock signal CLK_IN is generated from an input start pulse signal STH_IN. In the same manner, when a skew value of the skew control signal DLL_SKEW is 2 or 3, the output clock signal CLK_OUT delayed by a ⅖ or ⅜ period of the input clock signal CLK_IN is generated from the input clock signal CLK_IN, and an output start pulse signal STH_OUT delayed by a ⅖ or ⅜ period of the input clock signal CLK_IN is generated from an input start pulse signal STH_IN.

However, if a skew value of the skew control signal DLL_SKEW is 4 or greater, a delay effect of the output clock signal CLK_OUT and the output start pulse signal STH_OUT cannot be obtained from the skew adjustment circuit 100.

Accordingly there exists a need for skew adjustment circuit and method that can obtain an accurate delay effect.

SUMMARY OF THE INVENTION

According to an embodiment of the present invention, there is provided a skew adjustment circuit comprising: a delay circuit generating an output clock signal by delaying an input clock signal by a skew value in response to a skew control signal; a selection circuit selecting one of an input start pulse signal and a delayed start pulse signal by comparing the skew control signal and an offset control signal to output the selected signal as a start pulse signal; and an output circuit outputting the start pulse signal as an output start pulse signal in response to the output clock signal.

The selection circuit may comprise: a comparator comparing the offset control signal and the skew control signal to generate a selection signal; a D-flipflop generating the delayed start pulse signal by inputting the input start pulse signal in response to the input clock signal; and a mux unit selecting the input start pulse signal or the delayed start pulse signal in response to the selection signal to output the start pulse signal.

The offset control signal may be a skew value which is calculated based on at least one of pad delay, routing delay, and gate delay, of a timing controller in which the skew adjustment circuit is mounted, and may be stored in an internal register of the timing controller.

The skew control signal may be a skew value calculated based on delay of signal lines of a source driver and transmission lines between source drivers when implementing and testing a timing controller in which the skew adjustment circuit is mounted, and may be stored in an internal register of the timing controller.

The delay circuit may be a DLL (delay locked loop) circuit, and the output circuit may be formed of a D-flipflop in which the output clock signal is connected to a clock input of the D-flipflop, and the start pulse signal is connected to a data input of the D-flipflop, and the output start pulse signal is connected to a data output of the D-flipflop.

The selection circuit selects and outputs an input start pulse signal when the skew control signal is smaller than the offset control signal, and selects and outputs a delayed start pulse signal when the skew control signal is equal to or greater than the offset control signal.

According to another embodiment of the present invention, there is provided a method of adjusting skew, comprising: receiving an input clock signal; delaying the input clock signal by a skew value in response to a skew control signal to output the delayed input clock signal as an output clock signal; selecting one of an input start pulse signal and a delayed start pulse signal by comparing the skew control signal and an offset control signal to output the selected signal as a start pulse signal; and outputting the start pulse signal as an output start pulse signal in response to the output clock signal.

The step of selecting comprises generating a selection signal by comparing the skew control signal and an offset control signal; inputting the input start pulse signal in response to the input clock signal to output the input start pulse signal as a delayed start pulse signal; selecting one of the input start pulse signal or the delayed start pulse signal in response to the selection signal to output the selected signal as a start pulse signal.

The offset control signal may be a skew value which is calculated based on at least one of pad delay, routing delay, and gate delay, of a timing controller in which the skew adjustment circuit is mounted, and may be stored in an internal register of the timing controller.

The skew control signal may be a skew value calculated based on delay of signal lines of a source driver and transmission lines between source drivers when implementing and testing a timing controller in which the skew adjustment circuit is mounted, and may be stored in an internal register of the timing controller.

The step of selecting one of an input start pulse signal or a delayed start pulse signal further comprising: selecting the input start pulse signal when the skew control signal is smaller than the offset control signal; and selecting a delayed input start pulse signal when the skew control signal is equal to or greater than the offset control signal.

According to another embodiment of the present invention, there is provided an LCD panel comprising: a thin film transistor (TFT) unit; a driving circuit comprising a gate driver for driving gate lines of the TFT unit and a source driver for driving the source lines of the TFT unit; and a timing controller controlling the gate driver and the source driver based on display control signals and display data; wherein the time controller comprising a skew adjustment circuit comprising: a delay circuit generating an output clock signal by delaying an input clock signal by a skew value in response to a skew control signal; a selection circuit selecting one of an input start pulse signal or a delayed start pulse signal by comparing the skew control signal and an offset control signal to output the selected signal as a start pulse signal; and an output circuit outputting the start pulse signal as an output start pulse signal in response to the output clock signal.

The selection circuit comprises: a comparator comparing the offset control signal and the skew control signal to generate a selection signal; a D-flipflop generating the delayed start pulse signal by inputting the input start pulse signal in response to the input clock signal; and a mux unit selecting the input start pulse signal or the delayed start pulse signal in response to the selection signal to output the start pulse signal.

The output circuit may be a D-flipflop in which the output clock signal is connected to a clock input of the D-flipflop, and the start pulse signal is connected to a data input of the D-flipflop, and the output start pulse signal is connected to a data output of the D-flipflop.

The selection circuit selects and outputs an input start pulse signal when the skew control signal is smaller than the offset control signal; and selects and outputs a delayed start pulse signal when the skew control signal is equal to or greater than the offset control signal.

Accordingly, according to the skew adjustment circuit and the method of adjusting skew, by inputting an input clock signal and an input start pulse signal, an output clock signal and an output start pulse start signal, which are delayed by a skew value of a skew control signal, are output.

BRIEF DESCRIPTION OF THE DRAWINGS

Embodiments of the present invention will become more apparent by describing in detail exemplary embodiments thereof with reference to the attached drawings in which.

DESCRIPTION OF EMBODIMENTS

Figure 1:
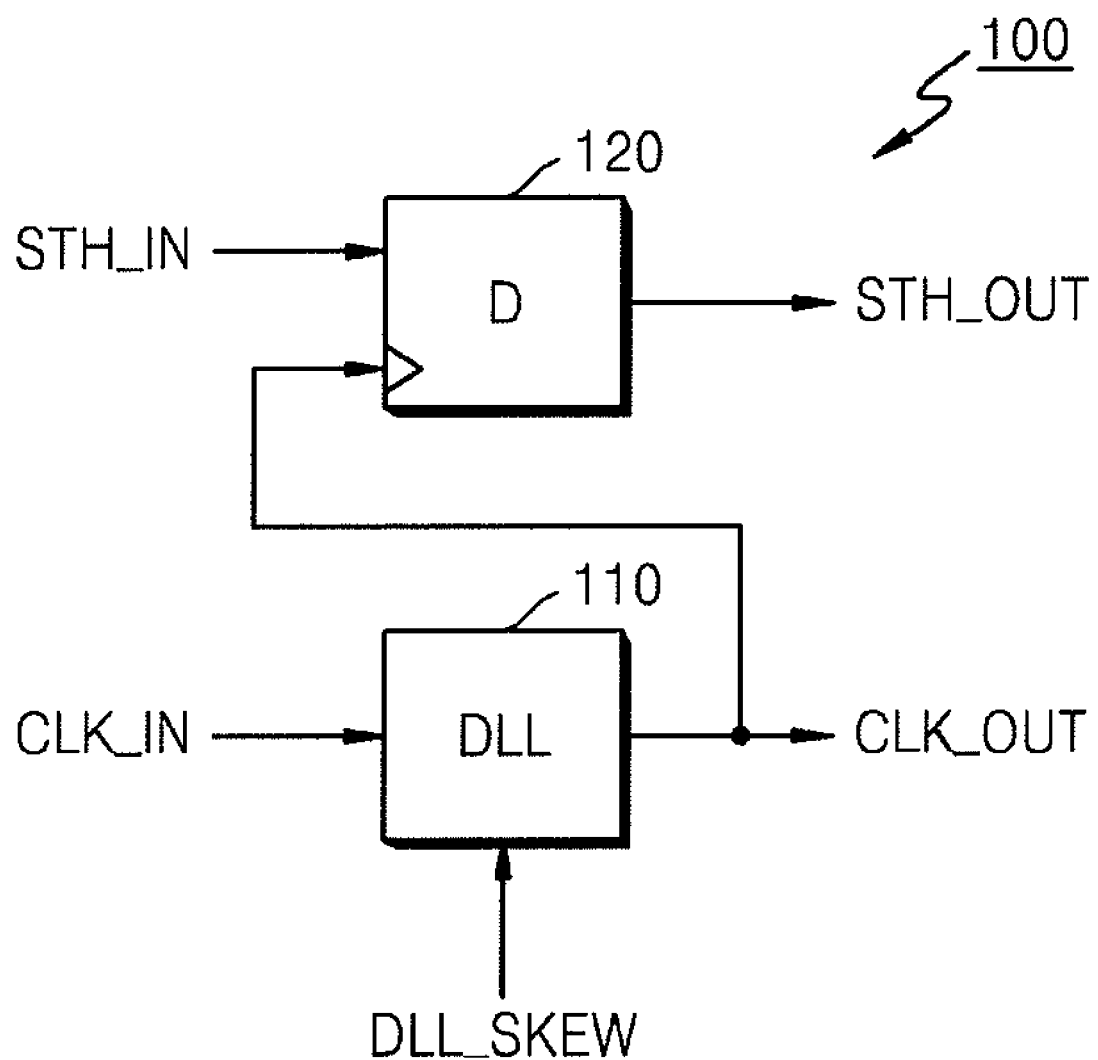
FIG. 1 illustrates a conventional skew adjustment circuit.
Figure 2:
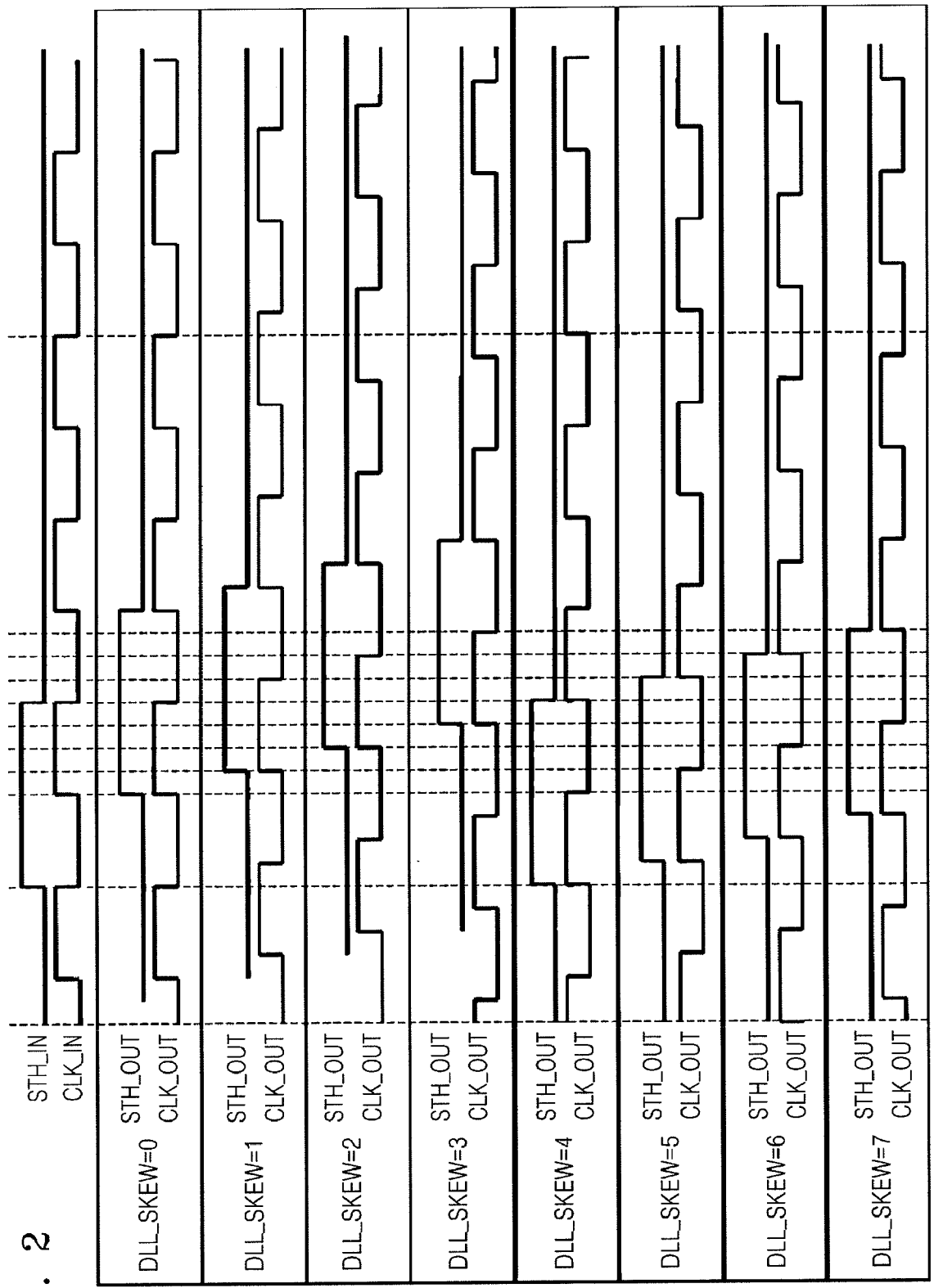
FIG. 2 is a timing diagram showing the operation of the skew adjustment circuit of FIG. 1.

Embodiments of the present invention will now be described more fully with reference to the accompanying drawings. This invention may, however, be embodied in many different forms and should not be constructed as limited to the embodiment set forth herein. The same reference numerals in the drawings may referrer to same or similar elements.

Figure 3:
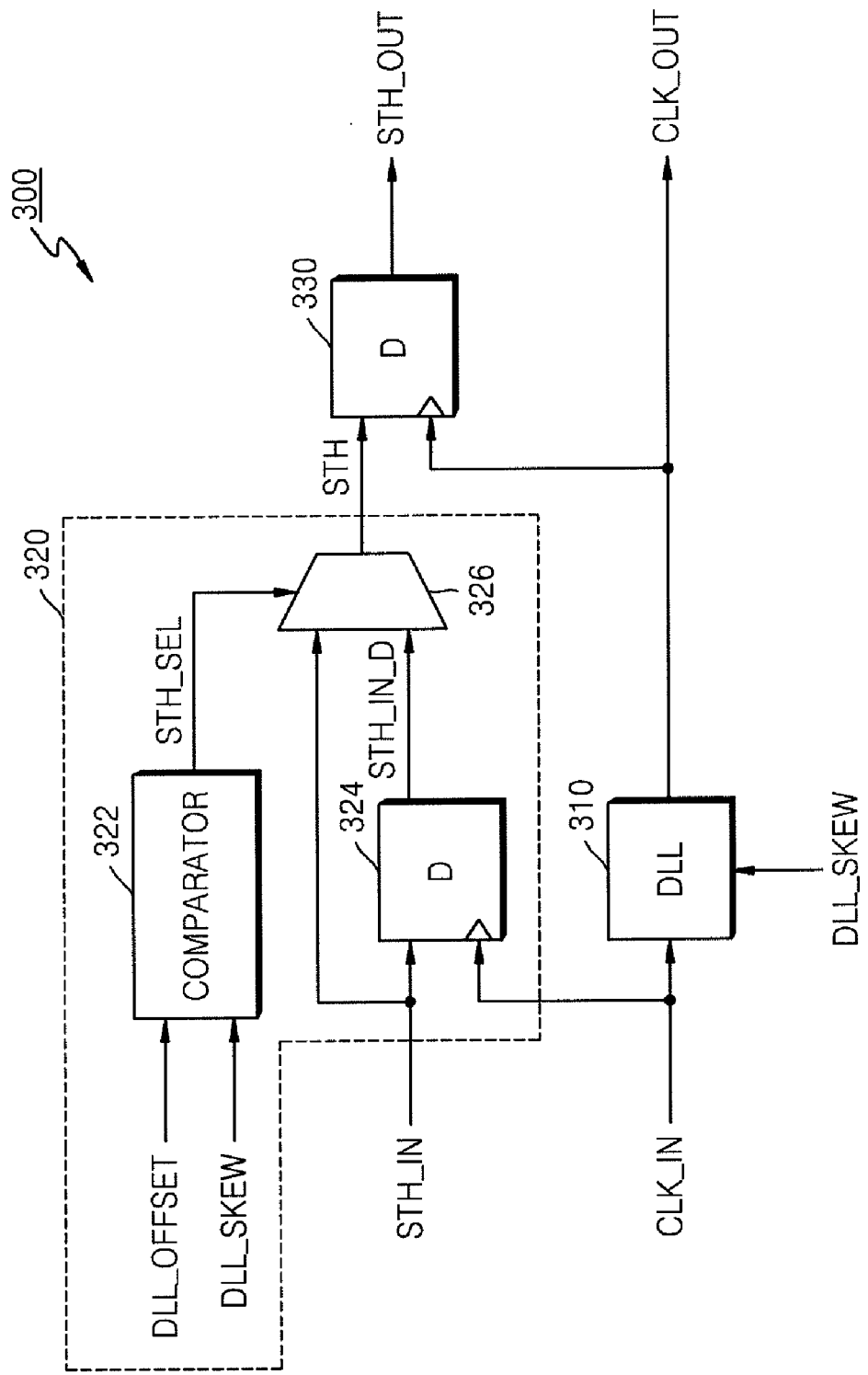
FIG. 3 illustrates a skew adjustment circuit according to an exemplary embodiment of the present invention.

FIG. 3 illustrates a skew adjustment circuit 300 according to an embodiment of the present invention. Referring to FIG. 3, the skew adjustment circuit 300 includes a delay circuit 310, a selection circuit 320, and an output circuit 330.

The delay circuit 310 responds to a skew control signal DLL_SKEW to delay an input clock signal CLK_IN by a skew value and to generate an output clock signal CLK_OUT. The delay circuit 310 may be formed of a general DLL (delay locked loop) circuit.

The selection circuit 320 includes a comparator 322 comparing an offset control signal DLL_OFFSET and a skew control signal DLL_SKEW to generate a selection signal STH_SEL, a D-flipflop 324 receiving an input start pulse signal STH_IN in response to an input clock signal CLK_IN to thereby generate a delayed start pulse signal STH_IN_D, and a mux unit 326 selecting an input start pulse signal STH_IN or a delayed start pulse signal STH_IN_D in response to the selection signal STH_SEL, to thereby output a start pulse signal STH.

The offset control signal DLL_OFFSET is a skew value which is set considering pad delay, routing delay, gate delay, etc. of a timing controller in which the skew adjustment circuit 300 is mounted, and is stored in an internal register. The skew control signal DLL_SKEW is a skew value set considering signal lines of a source driver and transmission lines between source drivers when implementing and testing a timing controller, and is stored in an internal register.

The selection circuit 320 selects and outputs an input start pulse signal STH_IN as a start pulse signal STH when the skew value of the skew control signal DLL_SKEW is smaller than the offset control signal DLL_OFFSET, and selects and outputs a delayed start pulse signal STH_IN_D as a start pulse signal STH when the skew value of the skew control signal DLL_SKEW is equal to or greater than the skew value of the offset control signal DLL_OFFSET.

The output circuit 330 responds to the output clock signal CLK_OUT to output the start pulse signal STH as an output start pulse signal STH_OUT. The output circuit 330 is formed of a D-flipflop in which the output clock signal is connected to a clock input of the D-flipflop, and a start pulse signal STH is connected to a data input of the D-flipflop, and an output start pulse signal STH_OUT is connected to a data output of the D-flipflop.

Figure 4:
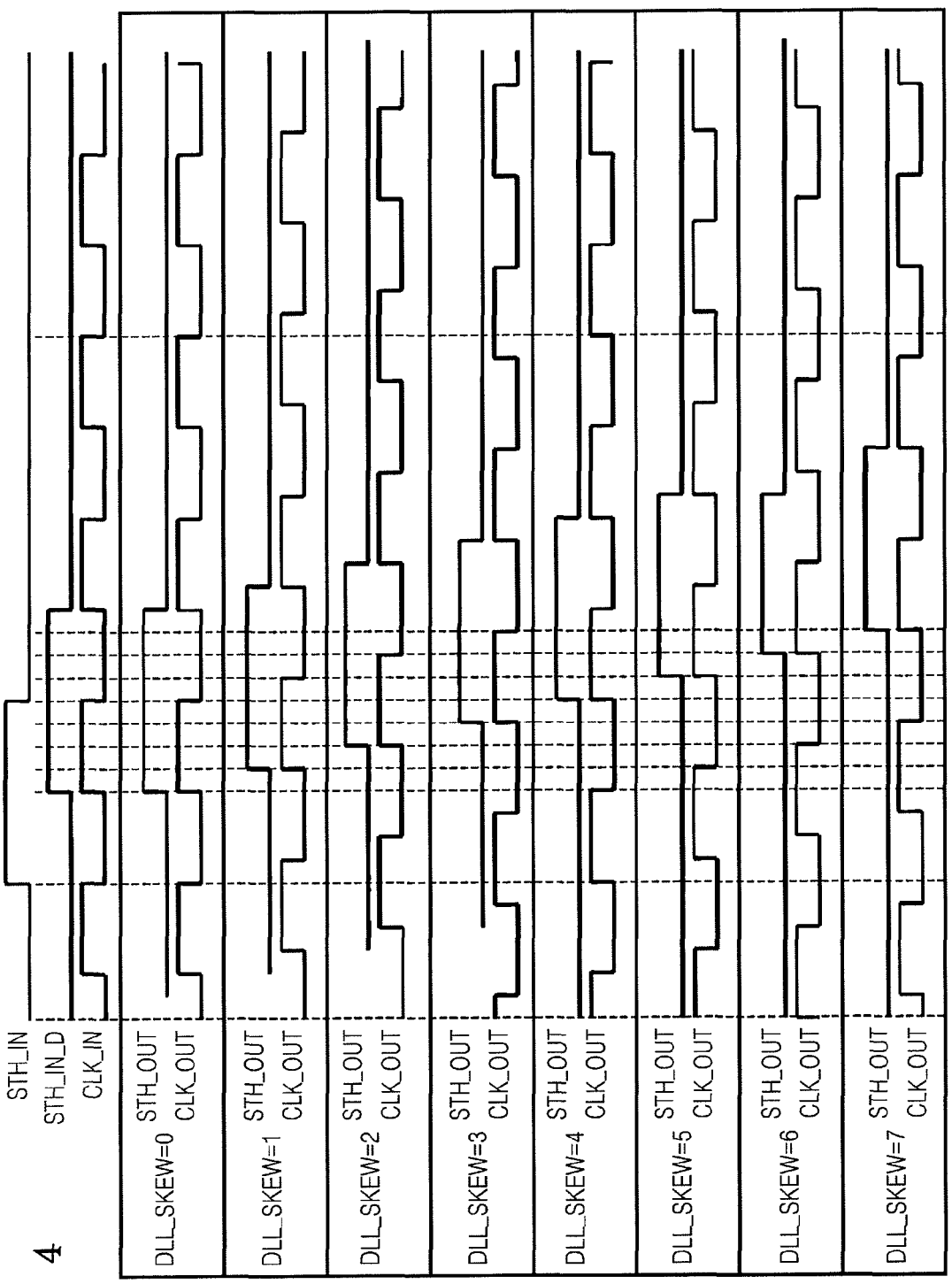
FIG. 4 is a timing diagram showing the operation of the skew adjustment circuit of FIG. 3 according to an embodiment of the present invention.

FIG. 4 is a timing diagram showing the operation of the skew adjustment circuit 300 of FIG. 3. First, if a skew value of the offset control signal DLL_OFFSET is 3, referring to FIG. 4, an input start pulse signal STH_IN is input, and an input clock signal CLK_IN is input. A delayed start pulse signal STH_IN_D in synchronization with a rising edge of the input clock signal CLK_IN is output. The output clock signal CLK_OUT responds to a skew value of the skew control signal DLL_SKEW, and is delayed from the input clock signal CLK_IN by, for example, a ⅛ period of the input clock signal CLK_IN multiplied by the skew value of the skew control signal DLL_SKEW to be output.

If a skew value of the skew control signal DLL_SKEW is smaller than 3, which is the value of the offset control signal DLL_OFFSET, the output start pulse signal STH_OUT responds to a rising edge of the output clock signal CLK_OUT and is output according to an input start pulse signal STH_IN. If the skew value of the skew control signal DLL_SKEW is equal to or greater than 3, which is the value of the offset control signal DLL_OFFSET, the output start pulse signal STH_OUT is output according to a delayed start pulse signal STH_IN_D in response to the rising edge of the output clock signal CLK_OUT.

Accordingly, the skew adjustment circuit 300 outputs an output clock signal CLK_OUT and an output start pulse start signal STH_OUT which are delayed by a skew value of a skew control signal DLL_SKEW.

Figure 5:
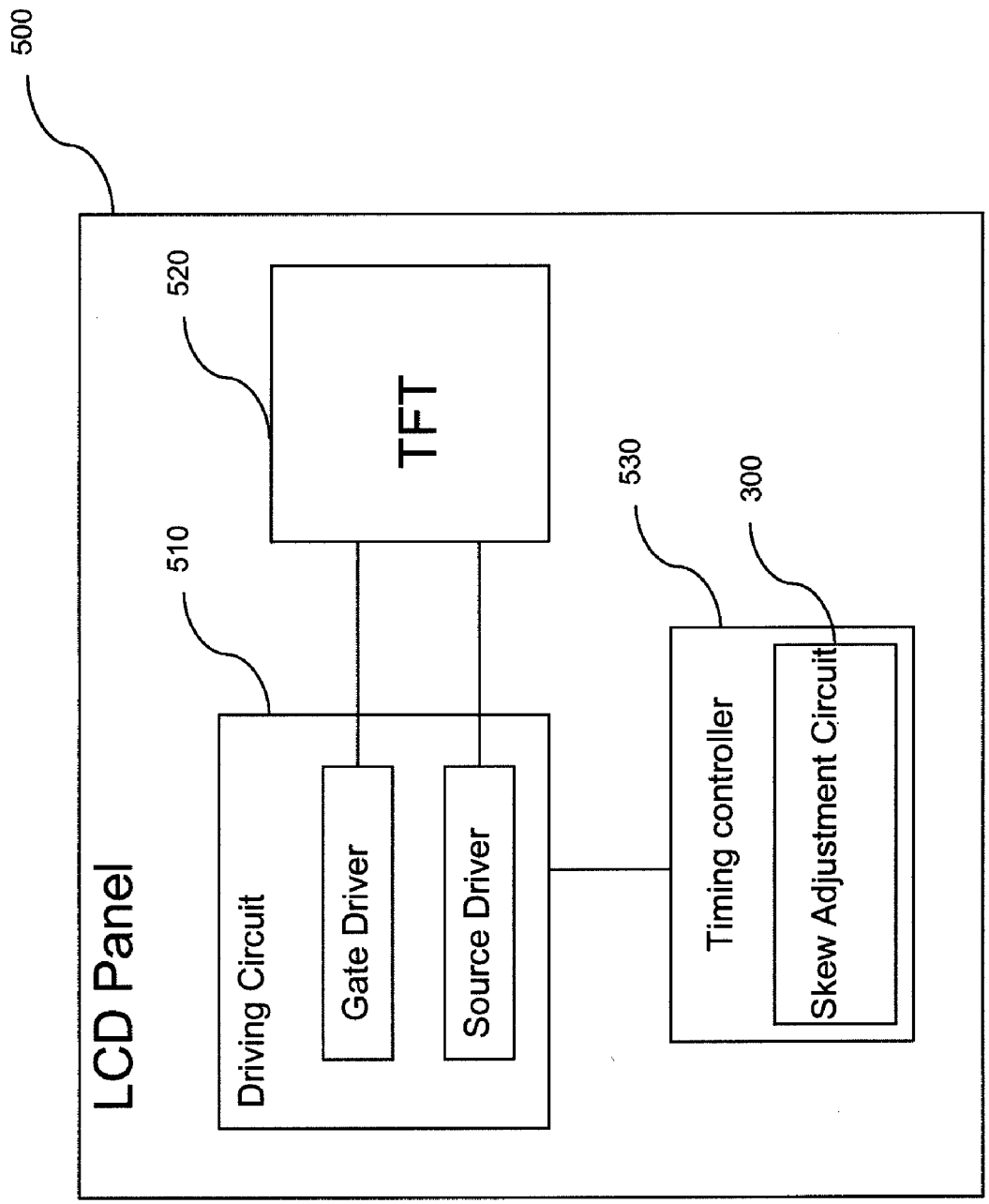
FIG. 5 illustrates a LCD panel having a skew adjustment circuit according to exemplary embodiment of the present invention.

FIG. 5 is a LCD panel having a skew adjustment circuit according to another exemplary embodiment of the present invention. Referring to FIG. 5, a LCD panel 500 comprises a TFT unit 520, a driving circuit 510 including a gate driver driving gate lines of a TFT unit, a source driver driving source lines of the TFT unit, and a timing controller 530. The timing controller 530 controls the gate driver and the source driver based on display control signals. The timing controller comprises a skew adjustment circuit 300. The skew adjustment circuit 300 adjusts the skew of the output clock signals to make the source driver accurately receive output display data. The operations of the skew adjustment circuit 300 are the same as the operations discussed with respect to FIG. 3, a description of these operations will be omitted.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A skew adjustment circuit comprising:
   a delay circuit generating an output clock signal by delaying an input clock signal by a skew value in response to a skew control signal;
   a selection circuit selecting one of an input start pulse signal or a delayed start pulse signal by comparing the skew control signal and an offset control signal to output the selected signal as a start pulse signal; and
   an output circuit outputting the start pulse signal as an output start pulse signal in response to the output clock signal.

2. The skew adjustment circuit of claim 1, wherein the selection circuit comprises:
   a comparator comparing the offset control signal and the skew control signal to generate a selection signal;
   a D-flipflop generating the delayed start pulse signal by inputting the input start pulse signal in response to the input clock signal; and
   a mux unit selecting the input start pulse signal or the delayed start pulse signal in response to the selection signal to output the start pulse signal.

3. The skew adjustment circuit of claim 1, wherein the offset control signal is a skew value calculated based on at least one of pad delay, routing delay, or gate delay, of a timing controller.

4. The skew adjustment of claim 3, wherein the offset control signal is stored in an internal register of the timing controller.

5. The skew adjustment circuit of claim 1, wherein the skew control signal is a skew value calculated based on delay of signal lines of a source driver and transmission lines between source drivers when implementing and testing a timing controller.

6. The skew adjustment circuit of claim 5, wherein the skew control signal is stored in an internal register of the timing controller.

7. The skew adjustment circuit of claim 1, wherein the delay circuit is a DLL (delay locked loop) circuit.

8. The skew adjustment circuit of claim 1, wherein the output circuit is a D-flipflop in which the output clock signal is connected to a clock input of the D-flipflop, and the start pulse signal is connected to a data input of the D-flipflop, and the output start pulse signal is connected to a data output of the D-flipflop.

9. The skew adjustment circuit of claim 1, wherein the selection circuit
   selects and outputs an input start pulse signal when the skew control signal is smaller than the offset control signal; and
   selects and outputs a delayed start pulse signal when the skew control signal is equal to or greater than the offset control signal.

10. A method of adjusting skew, comprising:
    receiving an input clock signal;
    delaying the input clock signal by a skew value in response to a skew control signal to output the delayed input clock signal as an output clock signal;
    selecting one of an input start pulse signal or a delayed start pulse signal by comparing the skew control signal and an offset control signal to output the selected signal as a start pulse signal; and
    outputting the start pulse signal as an output start pulse signal in response to the output clock signal.

11. The method of claim 10, wherein the step of selecting further comprising:
    generating a selection signal by comparing the skew control signal and an offset control signal;
    inputting the input start pulse signal in response to the input clock signal to output the input start pulse signal as a delayed start pulse signal; and
    selecting one of the input start pulse signal or the delayed input start pulse signal in response to the selection signal to output the selected signal as a start pulse signal.

12. The method of claim 10, wherein the offset control signal is a skew value calculated based on at least one of pad delay, routing delay, and gate delay, of a timing controller.

13. The method of claim 12, wherein the offset control signal is stored in an internal register of the timing controller.

14. The method of claim 10, wherein the skew control signal is a skew value calculated based on the delay of signal lines of a source driver and transmission lines between source drivers when implementing and testing a timing controller.

15. The method of claim 14, wherein the skew control signal is stored in an internal register of the timing controller.

16. The method of claim 10, wherein the step of selecting one of an input start pulse signal or a delayed start pulse signal further comprising:
    selecting the input start pulse signal when the skew control signal is smaller than the offset control signal; and
    selecting a delayed input start pulse signal when the skew control signal is equal to or greater than the offset control signal.

17. An LCD panel, comprising:
a thin film transistor (TFT) unit;
a driving circuit comprising a gate driver for driving gate lines of the TFT unit and a source driver for driving the source lines of the TFT unit; and
a timing controller controlling the gate driver and the source driver based on display control signals and display data;
wherein the time controller comprising a skew adjustment circuit comprising:
    a delay circuit generating an output clock signal by delaying an input clock signal by a skew value in response to a skew control signal;
    a selection circuit selecting one of an input start pulse signal or a delayed start pulse signal by comparing the skew control signal and an offset control signal to output the selected signal as a start pulse signal; and
    an output circuit outputting the start pulse signal as an output start pulse signal in response to the output clock signal.

18. The skew adjustment circuit of claim 17, wherein the selection circuit comprises:
    a comparator comparing the offset control signal and the skew control signal to generate a selection signal;
    a D-flipflop generating the delayed start pulse signal by inputting the input start pulse signal in response to the input clock signal; and
    a mux unit selecting the input start pulse signal or the delayed start pulse signal in response to the selection signal to output the start pulse signal.

19. The skew adjustment circuit of claim 17, wherein the output circuit is a D-flipflop in which the output clock signal is connected to a clock input of the D-flipflop, and the start pulse signal is connected to a data input of the D-flipflop, and the output start pulse signal is connected to a data output of the D-flipflop.

20. The skew adjustment circuit of claim 17, wherein the selection circuit
    selects and outputs an input start pulse signal when the skew control signal is smaller than the offset control signal; and
    selects and outputs a delayed start pulse signal when the skew control signal is equal to or greater than the offset control signal.

* * * * *